Oct. 29, 1957 H. B. PRICHARD 2,811,050
GYRO-CONTROLLED AUTOMATIC TRANSMISSION
Filed Dec. 20, 1956 3 Sheets-Sheet 1
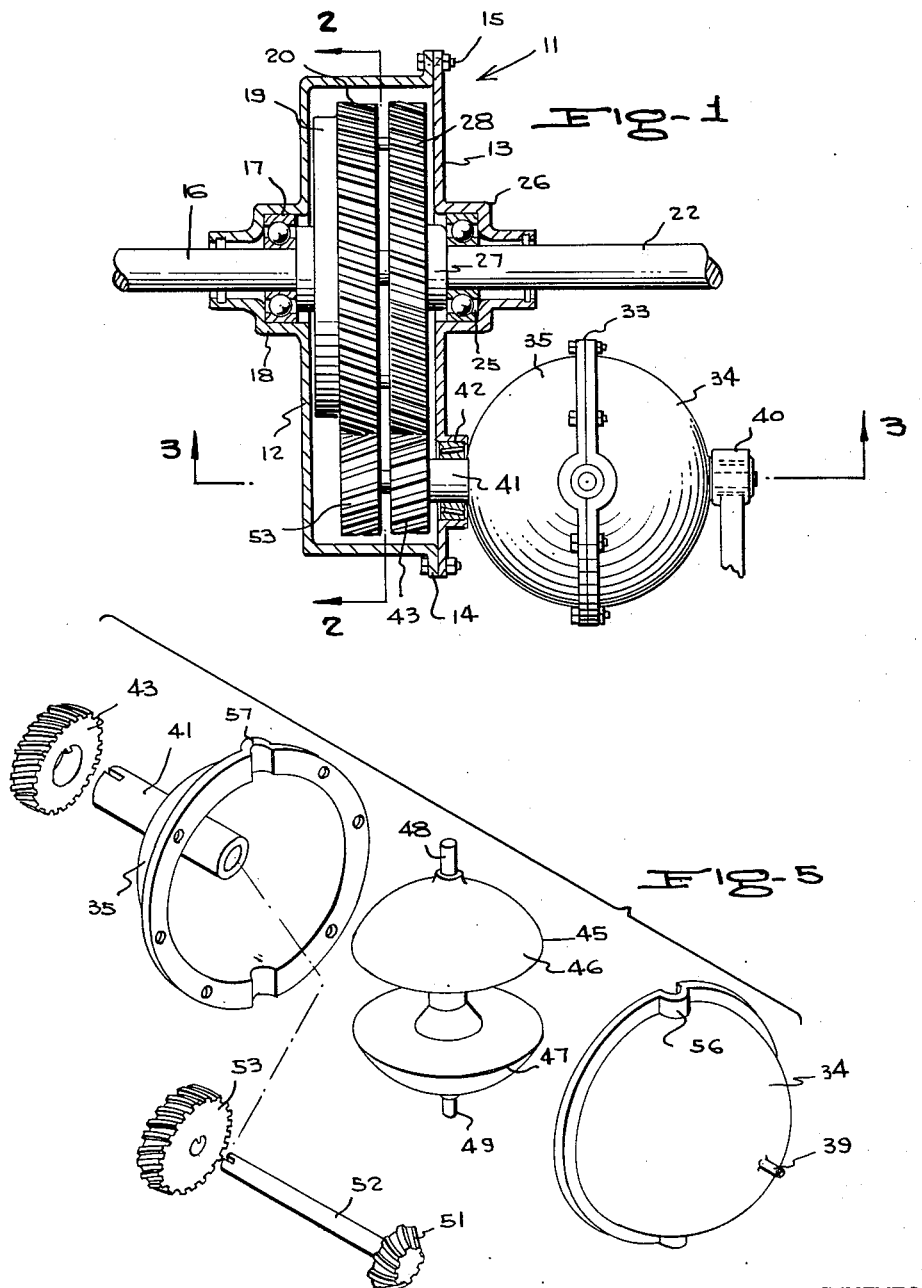
INVENTOR.
HOMER B. PRICHARD
BY
McMorrow, Berman & Davidson
ATTORNEYS Oct. 29, 1957 H. B. PRICHARD 2,811,050
GYRO-CONTROLLED AUTOMATIC TRANSMISSION
Filed Dec. 20, 1956 3 Sheets-Sheet 2
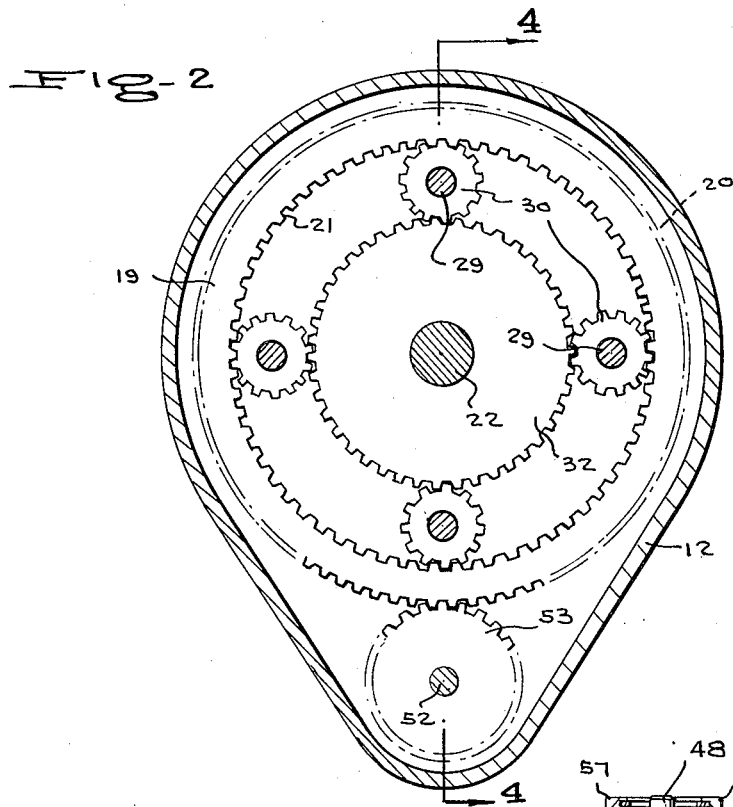
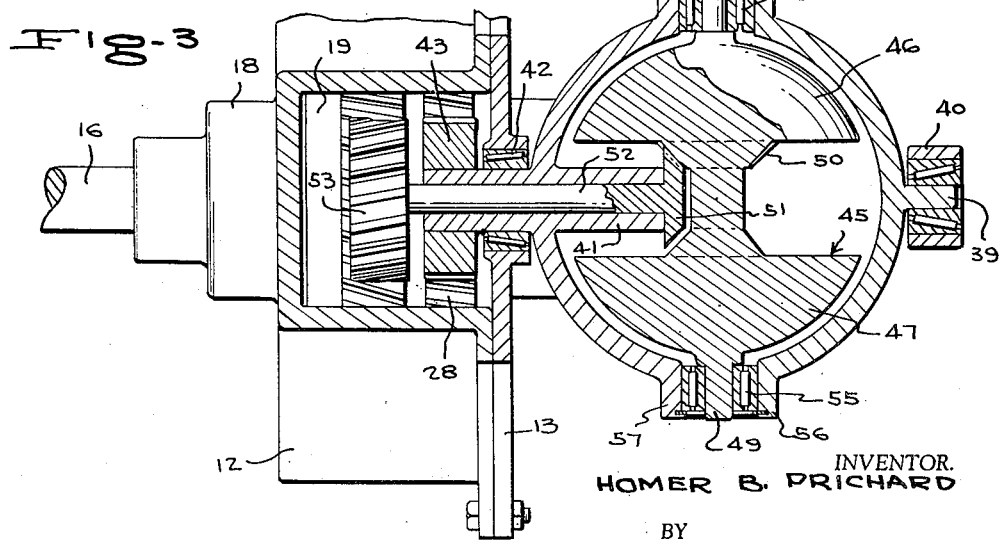
INVENTOR.
HOMER B. PRICHARD
BY
McMorrow, Berman & Davidson
ATTORNEYS

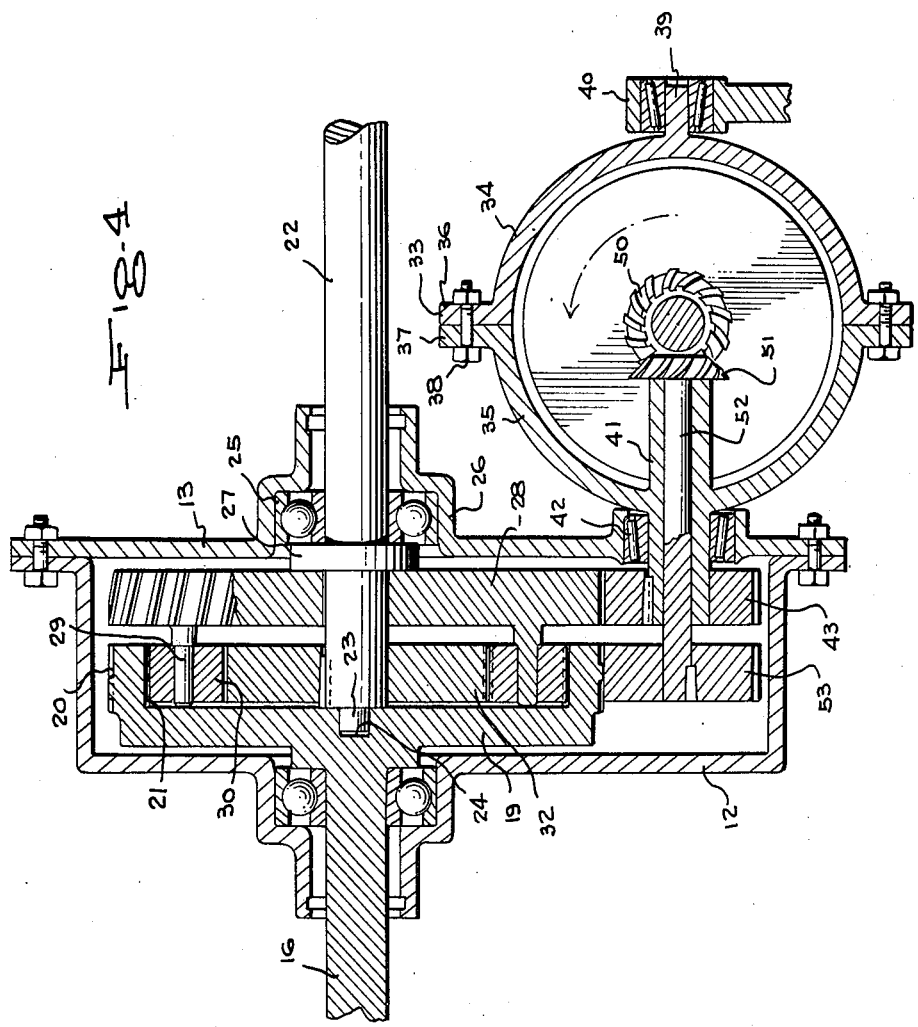

United States Patent Office 2,811,050
Patented Oct. 29, 1957

2,811,050

GYRO-CONTROLLED AUTOMATIC TRANSMISSION

Homer B. Prichard, San Diego, Calif.

Application December 20, 1956, Serial No. 629,702

4 Claims. (Cl. 74—751)

This invention relates to automatic transmissions, and more particularly to a variable speed transmission mechanism especially adapted for use in a motor vehicle to provide a torque transmission ratio which varies automatically with the load.

A main object of the invention is to provide a novel and improved gyro-controlled automatic transmission especially suitable for use with motor vehicles, or for use wherever it is desired to automatically vary the torque transmission ratio with the load, the improved transmission being simple in construction, involving relatively few parts, and being reliable in operation.

A further object of the invention is to provide an improved variable speed mechanism wherein the torque transmission ratio varies automatically with the load, the mechanism being inexpensive to fabricate, being rugged in construction, being relatively light in weight, and being compact in size, so that it may be readily installed in a motor vehicle, or in any other location wherein its use is desirable.

Further objects and advantages of the invention will become apparent from the following description and claims, and from the accompanying drawings, wherein:

Figure 1 is a vertical cross sectional view taken through the main housing of a gyro-controlled automatic transmission constructed in accordance with the present invention.

Figure 2 is an enlarged transverse vertical cross sectional view taken on line 2—2 of Figure 1.

Figure 3 is a horizontal cross sectional view taken on line 3—3 of Figure 1.

Figure 4 is a cross sectional view taken on line 4—4 of Figure 2.

Figure 5 is a perspective view of the gyro portion of the mechanism of Figures 1 to 4, shown in disassembled condition.

Referring to the drawings, 11 generally designates a variable speed transmission constructed in accordance with the present invention, said transmission having a main housing 12 including a removable rear wall 13 which is fastened to a peripheral flange 14 of the main housing 12 by suitable fasteners, such as by a plurality of bolts 15. Designated at 16 is a power input shaft which is connected to a suitable prime mover, such as, for example, an internal combustion engine associated with a motor vehicle, the input shaft 16 being journaled in the main housing 12, as by means of a suitable ball bearing assembly 17 mounted in a bearing housing 18 formed in the major wall of the main housing 12. Rigidly fixed to the input shaft 16 within the main housing 12 is a relatively large bell gear 19 formed with external teeth 20 and internal teeth 21. Designated at 22 is the output shaft of the assembly, said output shaft being arranged coaxially with the input shaft 16 and being formed at its inner end with a pilot stud 23 which is rotatably engaged in a central recess 24 formed in the bell gear, as is clearly shown in Figure 4. The output shaft 22 is journaled in the removable wall 13 of the main housing 12, as by a suitable ball bearing unit 25 mounted in a bearing housing 26 formed in the wall 13. Rigidly fixed on the shaft 22 in the housing 12 is a collar member 27 which serves as a retaining means for the ball bearing assembly 25.

Rotatably mounted on the shaft 22 adjacent the collar 27 is an idler gear 28 which is substantially the same in diameter as the bell gear 19 and which has rigidly secured thereto a plurality of laterally projecting shafts 29 located at equal radial distances from the axis of the gear 28. Rotatably mounted on the shafts 29 are respective planetary gears 30 which meshingly engage with the internal teeth 21 of the bell gear 19. Secured on the shaft 22 within the bell gear 19 and meshing with the planetary gears 30 is a sun gear 32, acting as the driving gear for the output shaft 22.

As will be apparent from Figure 4, the driving gear 19 can transmit torque to the gear 32 only if the planetary gears 30 are restrained in their rotary planetary movement around the toothed interior periphery of the bell gear 19. As will be presently described, this restraint is developed on the idler gear 28 which serves as the mounting for the planetary gears 30 and which is freely rotatable with respect to the output shaft 22.

Designated at 33 is a gyro housing comprising a pair of mating hemispherical segments 34 and 35 formed with abutting peripheral flanges 36 and 37 which are fastened together by a plurality of bolts 38. The housing segment 34 is formed with a pivot stud 39 which is journaled in a stationary bracket 40 secured to the frame of the vehicle in which the transmission mechanism is employed, or to any other stationary object in the event that the transmission mechanism is used in a device other than a vehicle. The stud 39 is disposed on an axis parallel to the common axis of the input and output shafts 16 and 22, as is readily apparent from Figure 4.

The gyro housing segment 35 is formed with a sleeve 41 aligned with the pivot stud 39, said sleeve extending externally of the segment 35 and being journaled in the removable rear wall 13 of the main housing 12, as by a suitable roller bearing assembly 42. Rigidly secured on the external end of the sleeve 41 is a relatively small gear 43 which meshes with the teeth of the idler gear 28. Gear 28 is thus coupled to the gyro housing 33, and rotation of gear 28 tends to cause the gyro housing 33 to rotate around the axis defined by the sleeve 41 and the pivot stud 39, said axis being parallel to the common axis of the input and output shafts of the transmission assembly.

Designated at 45 is a relatively massive gyro rotor member comprising a pair of heavy segments 46 and 47 integrally formed with diametrically opposed pivot studs 48 and 49, the segments 46 and 47 being portions of a common sphere slightly smaller in radius than the internal radius of the spherical gyro housing 33. The segments 46 and 47 are spaced apart to receive the sleeve 41. The segment 46 is formed on its inner face with an integral bevel gear 50 which meshes with a bevel gear 51 integrally formed on the end of a shaft 52 rotatably mounted in the sleeve 41. Rigidly secured to the outer end of shaft 52 is a gear 53, similar to the gear 43, but meshing with the external teeth of the bell gear 19.

The studs 48 and 49 are respectively journaled in roller bearing assemblies 54 and 55 which are housed in bearing housings defined between the respective pairs of mating semi-cylindrical elements 56 and 57 formed respectively on the housing segments 34 and 35.

As will be readily apparent from Figure 3, the massive gyro member 45 is journaled in the gyro housing 33 on an axis perpendicular to the axis of rotation of the gyro housing. As will be further apparent, the rotor member 46 is driven by the input shaft 16 through the external teeth of bell gear 19, the gear 53, the shaft 52, the bevel gear 51, and the bevel gear 50. Thus, the body 46 rotates at a speed in accordance with the speed of the input shaft 16. The gyro housing 33 is gearingly coupled to the idler 28 and through the planetary gear shafts 29 and the planetary gears 30 to the driving gear 32, whereby the gyro housing 33 rotates at a speed depending upon the difference in the rates of rotation of the output shaft 22 and the input shaft 16.

It will be readily apparent that if there is a difference in speed between the input and output shafts, the planetary gears 30 will tend to travel around the sun gear 32 and will thus apply a torque to the idler 28 which will be transmitted through the gear 43 to the gyro housing 33. However, the massive gyro rotor 45 rotates at a speed in accordance with the speed of rotation of the input shaft 16 and creates a resistance to the tendency of the gyro housing to rotate in accordance with the input shaft speed. The resistance of the rotor housing 33 to rotate freely is transmitted back through the gear 43 and the idler gear 28 to the planetary gear shafts 29 and acts to restrain the movement of the planetary gears 30 around the internal gear teeth 21 of bell gear 19 and thus allows the bell gear 19 to transfer torque to the driven gear 32 at a ratio in accordance with the amount of resistance to rotation imposed on the idler gear 28 by the gyro housing 33.

It will thus be seen that the load, transferred from the input shaft 22 to the gear 32, is transmitted back through the gyro housing 33, developing a tendency for the gyro housing 33 to rotate, which tendency is opposed by the rotating gyro member 45, the degree of opposition depending upon the speed of rotation of the input shaft 16. This is reflected as a restraint on the freedom of gear 28 to rotate and hence as a restraint on the freedom of the planetary gears 30 to move around the sun gear 32. The restraint on the free movement of the planetary gears allows torque to be transmitted from the bell gear 19 to the sun gear 32 to sustain the load. The product of the speed and torque on the output shaft 22 will be theoretically equal to the product of the speed and the torque at the input shaft 16, but the speed and torque at the output shaft 22 will vary, depending upon the variations in load on the output shaft. When the loading increases on the output shaft, the speed will automatically decrease and the torque will increase, although the product of the speed and the torque on the output shaft 22 will be maintained constant and will always be equal to the product of the speed and the torque of the input shaft 16.

As will be readily apparent from the above discussion, the gyro housing 33 is differentially geared to the driven gear 32 and the input shaft 16 in a manner whereby the rotation of the gyro housing will be limited in accordance with the rate of rotation of the massive gyro rotor 45 and in accordance with the load on the output shaft 22. The gyro housing 33 is gearingly coupled to the driven gear 32 through the idler gear 28 and the planetary gears 30, and is also gearingly coupled to the input shaft 16 through the planetary gears 30 and the internal teeth on the bell gear 19. Thus, the gyro housing 33 is differentially geared to both the driven gear 32 and the input shaft 16. Since the gyro housing 33 is limited in its rotation, in accordance with the speed of rotation of the massive gyro rotor 45, the differential action is regulated automatically by the two factors above mentioned, namely, the loading on the shaft 22 and the rate of rotation of the input shaft 16.

While a specific embodiment of an improved variable speed transmission has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a variable speed transmission, a main housing, a gyro housing journaled in a wall of said main housing, a relatively massive gyro member journaled in said gyro housing on an axis at right angles to the axis of rotation of the gyro housing, an input shaft, an externally and internally toothed gear on said input shaft, means coupling said gyro member to the external teeth of said gear, a driven gear rotatably mounted in said main housing concentrically with said first-named gear, an idler gear journaled in said main housing, planetary gears journaled on said idler gear and meshing between said driven gear and the internal teeth of said first-named gear, and means gearingly coupling said idler gear to said gyro housing, whereby said gyro housing is differentially coupled to said driven gear and said input shaft and whereby the rotation of said gyro housing will be limited in accordance with the rate of rotation of said gyro member and the load on said driven gear.

2. In a variable speed transmission, a main housing, a gyro housing journaled in a wall of said main housing, a relatively massive gyro member journaled in said gyro housing on an axis at right angles to the axis of rotation of the gyro housing, an input shaft, an externally and internally toothed gear on said input shaft, means coupling said gyro member to the external teeth of said gear, a driven gear rotatably mounted in said main housing concentrically with said first-named gear, an idler gear journaled in said main housing coaxially with said driven gear, planetary gears journaled on said idler gear and meshing between said driven gear and the internal teeth of said first-named gear, and a gear connected to said gyro housing and meshing with said idler gear, coupling said idler gear to said gyro housing, whereby said gyro housing is differentially coupled to said driven gear and said input shaft and whereby the rotation of said gyro housing will be limited in accordance with the rate of rotation of said gyro member and the load on said driven gear.

3. In a variable speed transmission, a main housing, an input shaft journaled in a wall of said main housing, an output shaft axially aligned with said input shaft and journaled in an opposite wall of said main housing, a gyro housing journaled in said opposite wall on an axis parallel to said shaft, a relatively massive gyro member journaled in said gyro housing on an axis perpendicular to said last-named axis, an externally and internally toothed gear on said input shaft, means gearingly coupling said gyro housing to the external teeth of said gear, a driven gear on said output shaft received in said first-named gear concentrically therewith, an idler gear rotatably mounted on said output shaft, planetary gears journaled on said idler gear meshing between said driven gear and the internal teeth of said first-named gear, and means gearingly coupling said idler gear to said gyro housing, whereby said gyro housing is differentially coupled to said output shaft and said input shaft and whereby the rotation of the gyro housing will be limited in accordance with the rate of rotation of said gyro member and the load on said output shaft.

4. In a variable speed transmission, a main housing, an input shaft journaled in a wall of said main housing, an output shaft axially aligned with said input shaft and journaled in an opposite wall of said main housing, a gyro housing journaled in said opposite wall on an axis parallel to said shaft, a relatively massive gyro member journaled in said gyro housing on an axis perpendicular to said last-named axis, an externally and internally toothed gear on said input shaft, means gearingly coupling said gyro housing to the external teeth of said gear, a driven gear on said output shaft received in said first-named gear concentrically therewith, an idler gear rotatably mounted on said output shaft, planetary gears journaled on said idler gear meshing between said driven gear and the internal teeth of said first-named gear, and a gear connected to said gyro housing and meshing with said idler gear, coupling said idler gear to said gyro housing, whereby said gyro housing is differentially coupled to said output shaft and said input shaft and whereby the rotation of said gyro housing will be limited in accordance with the rate of rotation of said gyro member and the load on said output shaft.

References Cited in the file of this patent

UNITED STATES PATENTS 2,031,286     Stern et al. _____ Feb. 18, 1936